US011885340B2

(12) United States Patent
Reimann et al.

(10) Patent No.: US 11,885,340 B2
(45) Date of Patent: Jan. 30, 2024

(54) COMPRESSOR ROTOR STRUCTURE

(71) Applicant: Siemens Energy Global GmbH & Co. KG, Munich (DE)

(72) Inventors: Martin Reimann, Essen (DE); David J. Peer, Smethport, PA (US); Marcus Meyer, Duisburg (DE); Sebastian Huth, Mönchengladbach (DE); Kevin Miny, Essen (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 17/997,830

(22) PCT Filed: May 14, 2020

(86) PCT No.: PCT/US2020/032946
§ 371 (c)(1),
(2) Date: Nov. 3, 2022

(87) PCT Pub. No.: WO2021/230874
PCT Pub. Date: Nov. 18, 2021

(65) Prior Publication Data
US 2023/0125483 A1 Apr. 27, 2023

(51) Int. Cl.
*F04D 17/12* (2006.01)
*F04D 29/10* (2006.01)
(Continued)

(52) U.S. Cl.
CPC ......... *F04D 17/122* (2013.01); *F04D 29/083* (2013.01); *F04D 29/102* (2013.01);
(Continued)

(58) Field of Classification Search
CPC ...... F04D 17/12; F04D 29/083; F04D 29/266; F04D 29/286; F05D 2260/31; F05D 2260/36; F05D 2240/55
See application file for complete search history.

(56) References Cited

U.S. PATENT DOCUMENTS 1,660,792 A * 2/1928 Hirth ........................ F16D 1/033
403/364
2,458,149 A * 1/1949 Cronstedt ................. F01D 5/06
416/244 R
(Continued)

FOREIGN PATENT DOCUMENTS

DE 102013110727 A1 4/2015
FR 3025559 A1 3/2016
JP s57210103 A 12/1982

OTHER PUBLICATIONS

PCT International Search Report and Written Opinion of International Searching Authority dated Jan. 29, 2021 corresponding to PCT International Application No. PCT/US2020/032946 filed May 14, 2020.

*Primary Examiner* — Eldon T Brockman
*Assistant Examiner* — Andrew J Marien

(57) ABSTRACT

Compressor rotor structure for turbomachinery, such as a compressor, is provided. Disclosed embodiments can benefit from sealing sleeves that may be arranged to inhibit passage onto respective hirth couplings of process fluid being processed by the compressor. The sealing sleeves may be affixed to adjoining structures (e.g., adjoining impeller bodies) by way of a slip fit connection to one of the adjoining structures and an interference fit connection with respect to the other adjoining structure, which is conducive to a user-friendly assembly of the sealing sleeves with the adjoining structures.

14 Claims, 2 Drawing Sheets

(51) Int. Cl.

| | |
|---|---|
| ***F04D 29/26*** | (2006.01) |
| ***F04D 29/28*** | (2006.01) |
| ***F04D 29/08*** | (2006.01) |

(52) U.S. Cl.

CPC ......... *F04D 29/266* (2013.01); *F04D 29/286* (2013.01); *F05D 2240/55* (2013.01); *F05D 2260/31* (2013.01); *F05D 2260/36* (2013.01)

(56) References Cited

U.S. PATENT DOCUMENTS

| | | | | |
|---|---|---|---|---|
| 2,650,017 | A * | 8/1953 | Pedersen ................... | F02C 3/06 416/244 R |
| 2,741,454 | A * | 4/1956 | Eppley .................... | F01D 5/066 416/244 R |
| 9,103,212 | B2 * | 8/2015 | Le Brusq ................ | F01D 5/025 |
| 2003/0017878 | A1 * | 1/2003 | Muju ...................... | F16D 1/033 464/157 |
| 2011/0052371 | A1 | 3/2011 | Aschenbruck et al. | |
| 2011/0262284 | A1 * | 10/2011 | Guernard .............. | F04D 17/122 29/428 |
| 2015/0316064 | A1 * | 11/2015 | Kosamana ............ | F04D 29/054 415/203 |
| 2015/0322961 | A1 * | 11/2015 | Slotman ................ | F04D 29/054 415/198.1 |
| 2016/0319820 | A1 * | 11/2016 | Venkatachalam ....... | F01D 5/066 |
| 2018/0371916 | A1 * | 12/2018 | Jahrmarcht ............. | F01D 5/066 |
| 2019/0112938 | A1 | 4/2019 | Shemyatovskiy et al. | |
| 2021/0262346 | A1 * | 8/2021 | Patel ..................... | F01D 11/003 |

* cited by examiner

COMPRESSOR ROTOR STRUCTURE

BACKGROUND

Disclosed embodiments relate generally to the field of turbomachinery, and, more particularly, to a rotor structure for a turbomachine, such as a compressor.

Turbomachinery is used extensively in the oil and gas industry, such as for performing compression of a process fluid, conversion of thermal energy into mechanical energy, fluid liquefaction, etc. One example of such turbomachinery is a compressor, such as a centrifugal compressor.

DETAILED DESCRIPTION

Figure 1:
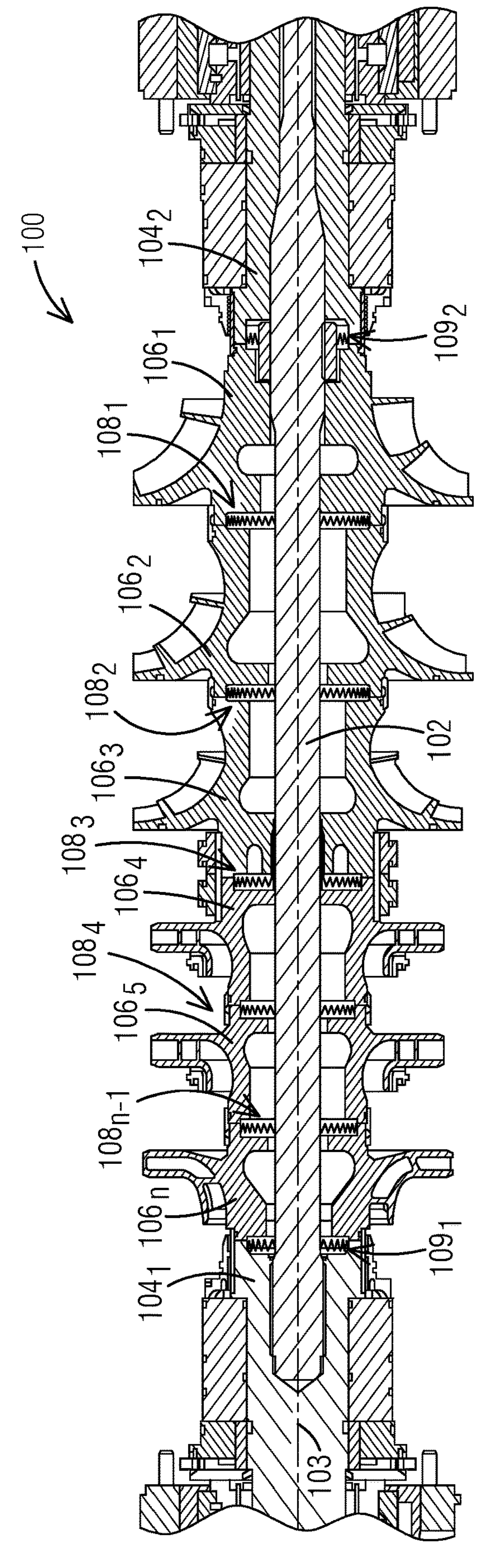
FIG. 1 illustrates a fragmentary cross-sectional view of one non-limiting embodiment of a disclosed rotor structure, as may be used in industrial applications involving turbomachinery, such as without limitation, centrifugal compressors.

As would be appreciated by those skilled in the art, turbomachinery, such as centrifugal compressors, may involve rotors of tie bolt construction (also referred to in the art as thru bolt or tie rod construction), where the tie bolt supports a plurality of impeller bodies and where adjacent impeller bodies may be interconnected to one another by way of elastically averaged coupling techniques, such as involving hirth couplings or curvic couplings. These coupling types use different forms of face gear teeth (straight and curved, respectively) to form a robust coupling between two components.

These couplings and associated structures may be subject to greatly varying forces (e.g., centrifugal forces), such as from an initial rotor speed of zero revolutions per minute (RPM) to a maximum rotor speed, (e.g., as may involve tens of thousands of RPM). Additionally, these couplings and associated structures may be exposed to contaminants and/or byproducts that may be present in process fluids processed by the compressor. If so exposed, such couplings and associated structures could be potentially affected in ways that could impact their long-term durability. By way of example, a combination of carbon dioxide (CO2), liquid water and high-pressure levels can lead to the formation of carbonic acid (H2CO3), which is a chemical compound that can corrode, rust or pit certain steel components. Physical debris may also be present in the process fluids that if allowed to reach the hirth couplings and associated structures could potentially affect their functionality and durability.

In view of the foregoing considerations, the present inventors have recognized that attaining consistent high performance and long-term durability in a centrifugal compressor, for example, may involve in disclosed embodiments appropriately covering respective hirth couplings with appropriate sealing structures to inhibit passage onto the respective hirth coupling of process fluid being processed by the compressor, and thus ameliorating the issues discussed above.

In the following detailed description, various specific details are set forth in order to provide a thorough understanding of such embodiments. However, those skilled in the art will understand that disclosed embodiments may be practiced without these specific details that the aspects of the present invention are not limited to the disclosed embodiments, and that aspects of the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may. It is noted that disclosed embodiments need not be construed as mutually exclusive embodiments, since aspects of such disclosed embodiments may be appropriately combined by one skilled in the art depending on the needs of a given application.

FIG. 1 illustrates a fragmentary cross-sectional view of one non-limiting embodiment of a disclosed rotor structure 100, as may be used in industrial applications involving turbomachinery, such as without limitation, compressors (e.g., centrifugal compressors, etc.).

In one disclosed embodiment, a tie bolt 102 extends along a rotor axis 103 between a first end and a second end of the tie bolt 102. A first rotor shaft $\mathbf{104}_1$ may be fixed to the first end of tie bolt 102. A second rotor shaft $\mathbf{104}_2$ may be fixed to the second end of tie bolt 102. Rotor shafts $\mathbf{104}_1$, $\mathbf{104}_2$ may be referred to in the art as stubs shafts. It will be appreciated that in certain embodiments more than two rotor shafts may be involved.

A plurality of impeller bodies 106, such as impeller bodies $\mathbf{106}_1$ through $\mathbf{106}_n$, may be disposed between rotor shafts $\mathbf{104}_1$, $\mathbf{104}_2$. In the illustrated embodiment, the number of impeller bodies is six and thus n=6; it will be appreciated that this is just one example and should not be construed in a limiting sense regarding the number of impeller bodies that may be used in disclosed embodiments. The embodiment illustrated in FIG. 1 involves a center-hung configuration of back-to-back impeller stages; it will be appreciated that this is just one example configuration and should not be construed in a limiting sense regarding the applicability of disclosed embodiments.

The plurality of impeller bodies 106 is supported by tie bolt 102 and is mechanically coupled to one another along the rotor axis by way of a plurality of hirth couplings, such as hirth couplings $\mathbf{108}_1$ through $\mathbf{108}_{n-1}$. In the illustrated embodiment, since as noted above, the number of impeller bodies is six, then the number of hirth couplings between adjoining impeller bodies 106 would be five. It will be appreciated that two additional hirth couplings $\mathbf{109}_1$ and $\mathbf{109}_2$ may be used to respectively mechanically couple the impeller bodies $\mathbf{106}_n$, $\mathbf{106}_1$ with respectively abutting rotor shafts $\mathbf{104}_1$, $\mathbf{104}_2$. It will be appreciated that the foregoing arrangement of impeller bodies and hirth couplings is just one example and should not be construed in a limiting sense.

Figure 2:
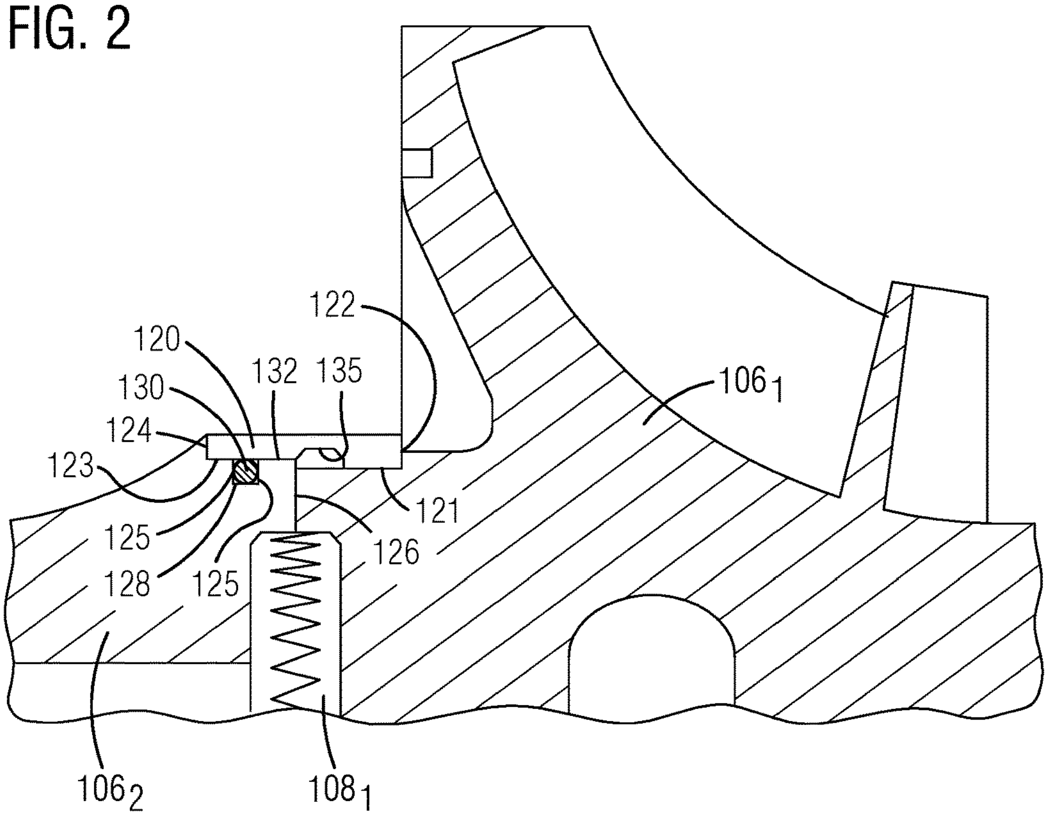
FIG. 2 illustrates a zoomed-in, cross-sectional view of portions of adjoining impeller bodies.

As may be better appreciated in FIG. 2, a disclosed embodiment may include a respective sealing sleeve 120 affixed onto respective radially outward surfaces 121, 123 of any two adjoining impeller bodies (e.g., adjoining impeller bodies $\mathbf{106}_1$, $\mathbf{106}_2$) of the plurality of impeller bodies 106. In this example, adjoining impeller bodies $\mathbf{106}_1$, $\mathbf{106}_2$ are mechanically coupled to one another by hirth coupling $108_1$. It will be appreciated that sealing sleeve 120 may be configured with a cylindrical cross-section about the rotor axis.

The respective sealing sleeve 120 may axially extend between a first axial edge 122 and a second axial edge 124 of sealing sleeve 120. Sealing sleeve 120 may be arranged to span (e.g., along 360 degrees) a circumferentially extending junction 126 between adjoining impeller bodies $106_1$, $106_2$ to inhibit passage onto the respective hirth coupling $108_1$ of process fluid being processed by the compressor. Respective sealing arrangements, as described above, would be featured in each of the remaining adjoining impeller bodies, such as between adjoining impeller bodies $106_2$, $106_3$, and so on and so forth.

In one non-limiting embodiment, sealing sleeve 120 may be affixed to a respective one of the two adjoining impeller bodies (e.g, impeller body $106_1$) by way of an interference fit. That is, a circumferential interference fit about radially outward surface 121 of impeller body $106_1$ In one non limiting embodiment, a radially inward surface 132 of sealing sleeve 120 may include a relief 135 (e.g, groove or cut) positioned between first axial edge 122 and second axial edge 124 of sealing sleeve 120 to facilitate assembly of sealing sleeve 120.

In this example, sealing sleeve 120 may be affixed to the other impeller body of the two adjoining impeller bodies (e.g, impeller body $106_2$) by way of a slip fit. For example, a radially inward surface 132 of sealing sleeve 120 would have a slightly larger diameter compared to the diameter of radially outward surface 123 of impeller body $106_2$. This type of affixing design involving a slip fit connection with respect to one of the two adjoining impeller bodies and an interference fit in connection with respect to the other of the two adjoining impeller bodies is conducive to user-friendly assembly of the sealing sleeves between the supporting structures, e.g., the respective radially outward surfaces 121, 123 of adjoining impeller bodies $106_1$,$106_2$.

In one non-limiting embodiment, a circumferentially-extending groove 128 may be disposed in a first (e.g., radially outward surface 123) of the radially outward surfaces 121, 123 of adjoining impeller bodies $106_1$,$106_2$. A seal member 130 is positioned in groove 128 to form a seal (e.g., extending along 360 degrees) between the first of the radially outward surfaces (e.g., radially outward surface 123) and sealing sleeve 120. Seal member 130 may be arranged to compressively abut against a corresponding radially inward surface 132 of sealing sleeve 120 and against a corresponding surface disposed at a respective axial location, such as the radially-extending surfaces 125 that in part define groove 128. This is effective to butress the sealing functionality of sealing sleeve 120 affixed to impeller body $106_2$ by way of the slip fit.

Without limitation, seal member 130 may be an O-ring, a C-shaped seal, an omega-shaped seal, a cloth seal or other seal member. As will be appreciated by one skilled in the art, a cloth seal may comprise a high temperature-resistant material, such as metal, ceramic or polymer fibers which may be woven, knitted or otherwise pressed into a layer of fabric.

Figure 3:
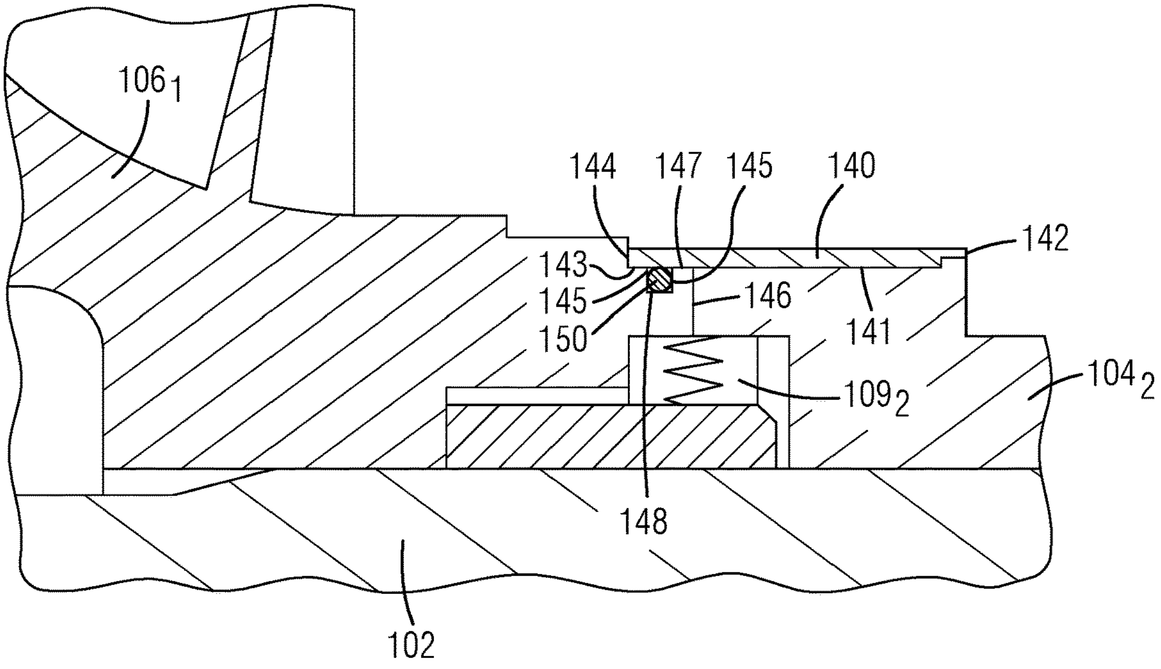
FIG. 3 illustrate a zoomed-in, cross-sectional view of portions of a rotor shaft and an abutting impeller body.

As may be better appreciated in FIG. 3, a disclosed embodiment may include a a further sealing sleeve 140 affixed onto respective radially outward surfaces 143, 141 of a respective abutting impeller body (e.g, impeller body $106_1$) of the plurality of impeller bodies 106 and a respective rotor shaft (e.g., rotor shaft $104_2$) of the two rotor shafts $104_1$, $104_2$. As noted above, the respective impeller body $106_1$ is mechanically coupled by hirth coupling $109_2$ to the respective rotor shaft $104_2$.

The further sealing sleeve 140 axially extends between a first axial edge 142 and a second axial edge 144 of the further sealing sleeve. The further sealing sleeve 140 may be arranged to span (e.g., along 360 degrees) a circumferentially extending junction 146 between impeller body $106_1$ and the abutting rotor shaft $104_2$ to inhibit passage onto hirth coupling $109_2$ of process fluid being processed by the compressor.

It will be appreciated that further sealing sleeve 140 may be configured with a cylindrical cross-section about the rotor axis. A sealing arrangement, as described above, would be featured in connection with impeller body $106_n$ and abutting rotor shaft $104_1$.

In one non-limiting embodiment, further sealing sleeve 140 may be affixed to a respective one of rotor shaft $104_2$ or the abutting impeller body (e.g, impeller body $106_1$) by way of an interference fit. That is, a circumferential interference fit about radially outward surface 141 of rotor shaft $104_2$. In this example, further sealing sleeve 140 may be affixed to abutting impeller body $106_1$ by way of a slip fit. For example, a radially inward surface 147 of further sealing sleeve 140 would have a slightly larger diameter compared to the diameter of radially outward surface 143 of impeller body $106_1$. This type of affixing design involving a slip fit connection with respect to one of a respective abutting impeller body (e.g, impeller body $106_1$) and a respective rotor shaft (e.g., rotor shaft $104_2$) is conducive to user-friendly assembly of the further sealing sleeve between the supporting structures, e.g., the radially outward surfaces 143, 141 of a respective abutting impeller body (e.g, impeller body $106_1$) of the plurality of impeller bodies 106 and a respective rotor shaft (e.g., rotor shaft $104_2$) of the two rotor shafts $104_1$, $104_2$.

In one non-limiting embodiment, a circumferentially-extending groove 148 may be disposed in a first one (e.g., radially outward surface 143) of the radially outward surfaces 141, 143 of rotor shaft $104_2$ and the abutting impeller body $106_1$. A seal member 150 is positioned in groove 148 to form a seal (e.g., along 360 degrees) between the first of the radially outward surfaces (e.g., radially outward surface 143) and further sealing sleeve 140. Seal member 150 may be arranged to compressively abut against a corresponding radially inward surface 147 of further sealing sleeve 140 and against a corresponding surface disposed at a respective axial location, such as radially-extending surfaces 145 that in part define groove 148. This is effective to butress the sealing functionality of further sealing sleeve 140 affixed to impeller body $106_1$ by way of the slip fit.

Without limitation, seal member 150 may be an O-ring, a C-shaped seal, an omega-shaped seal, a cloth seal or other seal member. As will be appreciated by one skilled in the art, a cloth seal may comprise a high temperature-resistant material, such as metal, ceramic or polymer fibers which may be woven, knitted or otherwise pressed into a layer of fabric.

In operation, disclosed embodiments can make use of sealing structures appropriately arranged to cover the hirth couplings and effective to inhibit passage onto the respective hirth coupling of process fluid being processed by the compressor, and thus inhibiting potential exposure of the hirth couplings and associated structures to contaminants, chemical byproducts, and/or physical debris.

While embodiments of the present disclosure have been disclosed in exemplary forms, it will be apparent to those skilled in the art that many modifications, additions, and deletions can be made therein without departing from the scope of the invention and its equivalents, as set forth in the following claims.

What is claimed is:

1. A rotor structure for a compressor, the rotor structure comprising:

a tie bolt and two rotor shafts extending along a rotor axis, the two rotor shafts respectively affixed to the tie bolt;

a plurality of impeller bodies disposed between the two rotor shafts, the plurality of impeller bodies supported by the tie bolt;

a plurality of hirth couplings arranged to mechanically couple the plurality of impeller bodies to one another along the rotor axis;

a respective sealing sleeve affixed onto respective radially outward surfaces of any two adjoining impeller bodies of the plurality of impeller bodies, the respective sealing sleeve arranged to span a circumferentially extending junction between the two adjoining impeller bodies to inhibit passage onto the respective hirth coupling of process fluid being processed by the compressor, wherein the sealing sleeve is affixed to a respective one of the two adjoining impeller bodies by way of an interference fit, wherein the sealing sleeve is affixed to the other one of the two adjoining impeller bodies by way of a slip fit; and a circumferentially-extending groove in a first of the radially outward surfaces, and a seal member positioned in the groove to form a seal between the first of the radially outward surfaces and the sealing sleeve.

2. The rotor structure of claim 1, wherein the seal member is an O-ring.

3. The rotor structure of claim 1, where the respective sealing sleeve is configured about the rotor axis with a cylindrical cross-section.

4. The rotor structure of claim 1, comprising a further sealing sleeve affixed onto respective radially outward surfaces of a respective rotor shaft of the two rotor shafts and a respective impeller body of the plurality of impeller bodies in abutting relationship with the respective rotor shaft, the abutting impeller body mechanically coupled by a further hirth coupling of the plurality of hirth couplings to the respective rotor shaft, the further sealing sleeve arranged to span a circumferentially extending junction between the abutting impeller body and the respective rotor shaft to inhibit passage onto the further hirth coupling of process fluid being processed by the compressor.

5. The rotor structure of claim 4, wherein the further sealing sleeve is affixed to one of the respective rotor shafts and the abutting impeller body by way of an interference fit.

6. The rotor structure of claim 5, wherein the further sealing sleeve is affixed to the other one of the respective rotor shafts and the abutting impeller body by way of a slip fit.

7. The rotor structure of claim 4, where the respective further sealing sleeve is configured about the rotor axis with a cylindrical cross-section.

8. The rotor structure of claim 4, further comprising a circumferentially-extending groove in a first of the radially outward surfaces, and a seal member positioned in the groove to form a seal between the first of the radially outward surfaces and the further sealing sleeve.

9. The rotor structure of claim 8, wherein the seal member is an O-ring.

10. The rotor structure of claim 1, wherein the respective sealing sleeve is arranged to span 360 degrees the circumferentially extending junction between the two adjoining impeller bodies.

11. The rotor structure of claim 4, wherein the respective further sealing sleeve is arranged to span 360 degrees the circumferentially extending junction between the respective impeller body and the respective rotor shaft.

12. The rotor structure of claim 1, wherein the respective radially outward surfaces of the two adjoining impeller bodies are adjoining surfaces.

13. The rotor structure of claim 4, wherein the respective radially outward surfaces of the respective rotor shaft and the abutting impeller body are adjoining surfaces.

14. The rotor structure of claim 1, wherein the compressor is a centrifugal compressor.

* * * * *